United States Patent
Watanabe

[11] Patent Number: 5,889,613
[45] Date of Patent: Mar. 30, 1999

[54] LENTICULAR LENS SHEET FOR USE IN REAR PROJECTION TELEVISION

[75] Inventor: Hitomu Watanabe, Tokyo, Japan

[73] Assignee: Dai Nippon Printing Co., Ltd., Tokyo, Japan

[21] Appl. No.: 822,700

[22] Filed: Mar. 21, 1997

[30] Foreign Application Priority Data

Mar. 25, 1996 [JP] Japan .................................. 8-068196

[51] Int. Cl.[6] .................................................. G03B 21/60
[52] U.S. Cl. ............................................................ 359/456
[58] Field of Search .................................... 359/455, 456, 359/457

[56] References Cited

U.S. PATENT DOCUMENTS

| | | | |
|---|---|---|---|
| 4,936,652 | 6/1990 | Clausen et al. | 350/128 |
| 5,071,224 | 12/1991 | Yokoo | 359/456 |
| 5,400,114 | 3/1995 | Yoshida et al. | 359/457 |
| 5,661,600 | 8/1997 | Mitani et al. | 359/457 |
| 5,687,024 | 11/1997 | Yoshimura et al. | 359/455 |

FOREIGN PATENT DOCUMENTS

| | | | |
|---|---|---|---|
| 0 254 199 | 1/1988 | European Pat. Off. | G03B 21/62 |
| 0 671 653 | 9/1995 | European Pat. Off. | G03B 21/62 |

OTHER PUBLICATIONS

Patent Abstracts of Japan vol. 014, No. 474 (P–1117), Oct. 16, 1990, & JP 02 190835 A (Kyowa Gas Chem Ind Co Ltd), Jul. 26, 1990, *Abstracts.

*Primary Examiner*—Safet Metjahic
*Assistant Examiner*—Christopher E. Mahoney
*Attorney, Agent, or Firm*—Sughrue, Mion, Zinn, Macpeak & Seas, PLLC

[57] ABSTRACT

A lenticular lens sheet for a rear projection television, which exhibits smooth color change and has a wide viewing angle even in a television set having a large convergence angle. A group of vertical straight-line shaped entrance-side lens surfaces are provided on an entrance side I of the lenticular lens sheet. Each entrance-side lens surface has a cross-section defined approximately by a part of an ellipse, and satisfies the condition of $2.5 \leq bp/a^2 \leq 3.0$, where b is the major axis of the ellipse; a is the minor axis of the ellipse; and p is the width of each entrance-side lens surface. A group of vertical straight-line shaped exit-side lens surfaces are provided on an exit side O of the lenticular lens sheet. Each exit-side lens surface has a cross-section defined approximately by a part of an ellipse, and satisfies the condition of $0.55 \leq b/(a^2\phi) \leq 0.75$, where $\phi$ is a convergence angle formed by two adjacent projection tubes. A light-absorbing layer BS is provided on each light-blocking portion. The thickness L of the lenticular lens sheet from the bottom of the entrance-side lens surface I to the vertex of the exit-side lens surface O is set so that light entering the lens through the bottom of the entrance-side lens surface I intersects the center axis outside the exit-side lens surface O.

4 Claims, 16 Drawing Sheets

FIG. 4
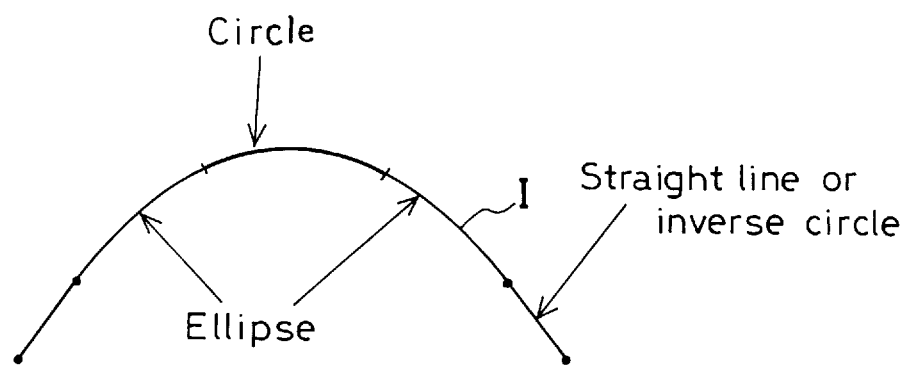
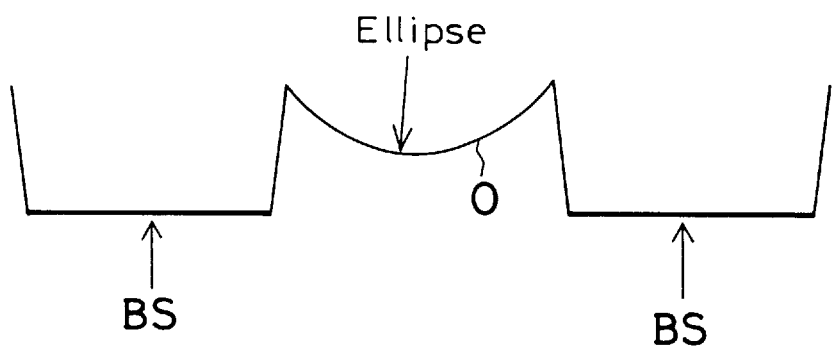

LENTICULAR LENS SHEET FOR USE IN REAR PROJECTION TELEVISION

BACKGROUND OF THE INVENTION

The present invention relates to lenticular lens sheets and, more particularly, to a lenticular lens sheet for a screen used in a rear projection television.

Since projection televisions are not so bright as CRT direct-viewing televisions, a screen as bright as possible has heretofore been demanded. Consequently, there has been a demand for a lenticular lens surface configuration exhibiting a high luminance and a large αH [angle at which the gain is a half of the peak value in a gain chart (i.e. half-power angle)] such that the loss of incident light is minimized, and a large amount of light emanates in the forward direction. A configuration of a lenticular lens that meets such a demand is disclosed, for example, in Japanese Patent Application Post-Examination Publication No. 7-19029. In the prior art, both the entrance- and exit-side lens surfaces of a lenticular lens have an approximately elliptical sectional configuration, and a light-absorbing layer is formed on a light-blocking portion of the exit-side surface. Incident light is focused in the lenticular lens. The exit-side lens surface is formed in the vicinity of the focus point. In its light diffusion characteristic chart (gain chart), the lenticular lens has a bell-shaped characteristic curve that rises sharply near 45°.

On the other hand, there has recently been a demand for a lenticular lens configuration capable of providing uniform color and luminance over a wide angle range, in disregard of some loss of light, owing to the improvement in performance of projection tubes, etc. In particular, with the achievement of thin television sets, a screen having a larger convergence angle than the conventional ones and yet exhibiting excellent uniformity has been required. In the case of the above-described conventional lenticular lens configuration, the characteristic curves of R (red), G (green) and B (blue) in the gain chart rise rapidly near 45° at respective points displaced relative to each other. Therefore, the luminance ratio of each color becomes large near 45°, causing the television screen to look undesirably colored as viewed from an oblique direction.

SUMMARY OF THE INVENTION

In view of the above-described problems associated with the prior art, an object of the present invention is to provide a rear projection screen exhibiting smooth color change and having a wide viewing angle even in a television set having a large convergence angle.

From a study of lenticular lens configurations to solve the above-described problem, we have found that a lenticular lens sheet arranged as stated below provides advantageous effects that, in a gain chart, green light (G) has an approximately triangular diffusion characteristic curve, and red light (R) and blue light (B) each have a truncated approximately triangular characteristic curve, and further the ratio of R/B assumes a relatively small value over the entire range. In the lenticular lens sheet, a group of vertical straight-line shaped entrance-side lens surfaces each have a cross-section defined approximately by a part of an ellipse, and satisfy the following condition:

$2.5 \leq bp/a^2 \leq 3.0$ where b is the major axis of the ellipse; a is the minor axis of the ellipse; and p is the width of each of the entrance-side lens surfaces.

A group of vertical straight-line shaped exit-side lens surfaces each have a cross-section defined approximately by a part of an ellipse, and satisfy the following condition:

$0.55 \leq b/(a^2\phi) \leq 0.75$ where b is the major axis of the ellipse; a is the minor axis of the ellipse; and $\phi$ is an angle formed by two adjacent projection tubes with respect to the center of a screen sheet.

A light-absorbing layer is provided on each of light-blocking portions of the exit-side lens surfaces, and the thickness L of the lenticular lens sheet from the bottom of each entrance-side lens surface to the vertex of each exitside lens surface satisfies the following condition:

$L \leq p/[2 \tan\{\theta_1 - \arcsin(\sin\theta_1/n)\}]$ where p: a lenticular lens pitch of the lenticular lens sheet;

$\theta_1$: the angle of the normal to the entrance-side lens surface at the bottom thereof; and n: the refractive index of the lenticular lens sheet.

Even if the above-described conditions are satisfied, a weak cutoff may occur in the gain chart depending upon the combination thereof. In this regard, we have found that the characteristic curve in the gain chart can be made still gentler by arranging the sectional configuration of each entrance-side lens surface such that a foot portion of the entrance-side lens surface is formed from a straight line or a part of an inverse circle having a center of curvature in the entrance-side space.

In the gain chart, G shows an approximately triangular characteristic curve, and R and B each show a truncated approximately triangular characteristic curve. Therefore, there is a slight luminance difference between G on the one hand and R and B on the other. In this regard, we have found that the top of the characteristic curve of G can be rounded to minimize the luminance difference by arranging the sectional configuration of each entrance-side lens surface such that the vertex portion of the entrance-side lens surface is formed from a part of a circle having a larger radius of curvature than that of the ellipse.

More specifically, the present invention provides a lenticular lens sheet used for a rear projection screen of a rear projection television, The lenticular lens sheet includes a group of vertical straight-line shaped entrance-side lens surfaces provided on an entrance side of the lenticular lens sheet. The entrance-side lens surfaces each have a cross-section defined approximately by a part of an ellipse, and satisfy the following condition:

$2.5 \leq bp/a^2 \leq 3.0$ where b is the major axis of the ellipse; a is the minor axis of the ellipse; and p is the width of each of the entrance-side lens surfaces.

The lenticular lens sheet further includes a group of vertical straight-line shaped exit-side lens surfaces provided on an exit side of the lenticular lens sheet. The exit-side lens surfaces each have a cross-section defined approximately by a part of an ellipse, and satisfy the following condition:

$0.55 \leq b/(a^2\phi) \leq 0.75$ where b is the major axis of the ellipse; a is the minor axis of the ellipse; and $\phi$ is an angle formed by two adjacent projection tubes with respect to the center of a screen sheet.

A light-absorbing layer is provided on each of light-blocking portions of the exit-side lens surfaces.

The thickness L of the lenticular lens sheet from the bottom of each entrance-side lens surface to the vertex of each exit-side lens surface satisfies the following condition:

$L \leq p/[2 \tan\{\theta_1 - \arcsin(\sin\theta_1/n)\}]$ where p: a lenticular lens pitch of the lenticular lens sheet;

$\theta_1$: the angle of the normal to the entrance-side lens surface at the bottom thereof; and n: the refractive index of the lenticular lens sheet.

In this case, each entrance-side lens surface may have a sectional configuration in which a foot portion of the entrance-side lens surface in the range of from 2% to 10% from the bottom is formed from a straight line or a part of an inverse circle having a center of curvature in the entrance-side space. Alternatively, each entrance-side lens surface may have a sectional configuration in which the vertex portion of the entrance-side lens surface is formed from a part of a circle having a larger radius of curvature than that of the ellipse.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is a view for describing a modification of the present invention.

DESCRIPTION OF THE PREFERRED EMBODIMENTS

Some examples of the lenticular lens sheet according to the present invention will be described below in detail with reference to the accompanying drawings.

Figure 1:
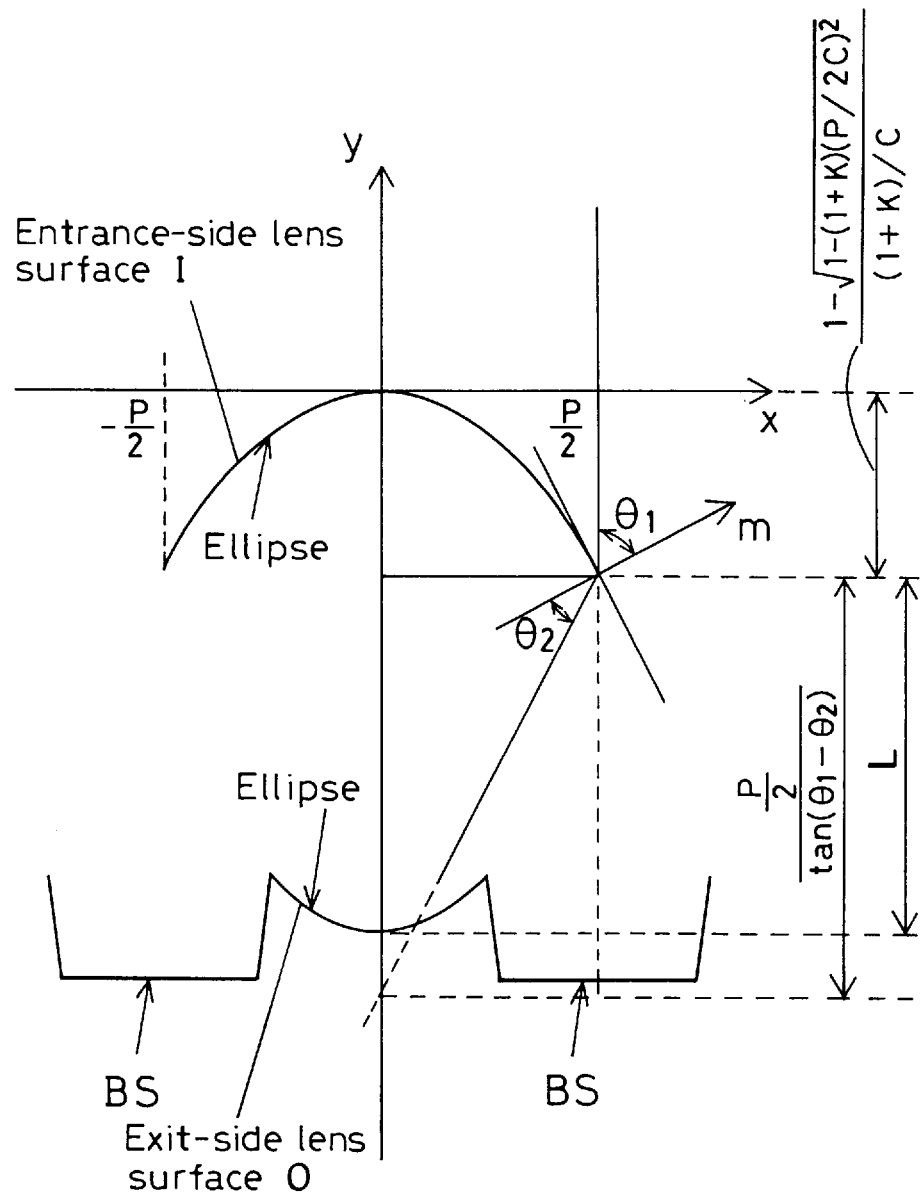
FIG. 1 is a sectional view of a repeating unit of the lenticular lens sheet according to the present invention.

FIG. 1 is a sectional view of a repeating unit of the lenticular lens sheet according to the present invention. When the origin of a coordinate system is set at the vertex of an ellipse, the equation of the ellipse may be given by $$y=-(x^2/c)/[1+\{1-(1+k)(x/c)^2\}^{1/2}]$$

$$=-[1\{1-(1+k)(x/c)^2\}^{1/2}]/\{(1+k)/c\} \quad (1)$$

This is a general equation capable of expressing not only an ellipse but also a parabola, a hyperbola, etc. according to the value of k. When $-1<k<0$, an ellipse longer in the y-axis direction is obtained.

The present inventor examined the gain charts of various lenticular lens configurations and, as a result, found that color shift is improved in a case where an entrance-side lens surface I has an elliptical sectional configuration in which the value of p/c is in the range of from 2.5 to 3.0, where p is the lenticular lens surface pitch (i.e. the width of each lens surface), and an exit-side lens surface O has an elliptical sectional configuration in which the value of $1/\phi c$ is in the range of from 0.55 to 0.75, where $\phi$ is the convergence angle of projected light, and further, light entering the lens through the bottom of the entrance-side lens surface I intersects the center line outside the exit-side lens surface O. It should be noted that the exit-side lens surface O is aligned with the entrance-side lens surface I, and a stripe-shaped light-absorbing layer BS is provided on a light-blocking portion between each pair of adjacent exit-side lens surfaces O.

Figure 2:
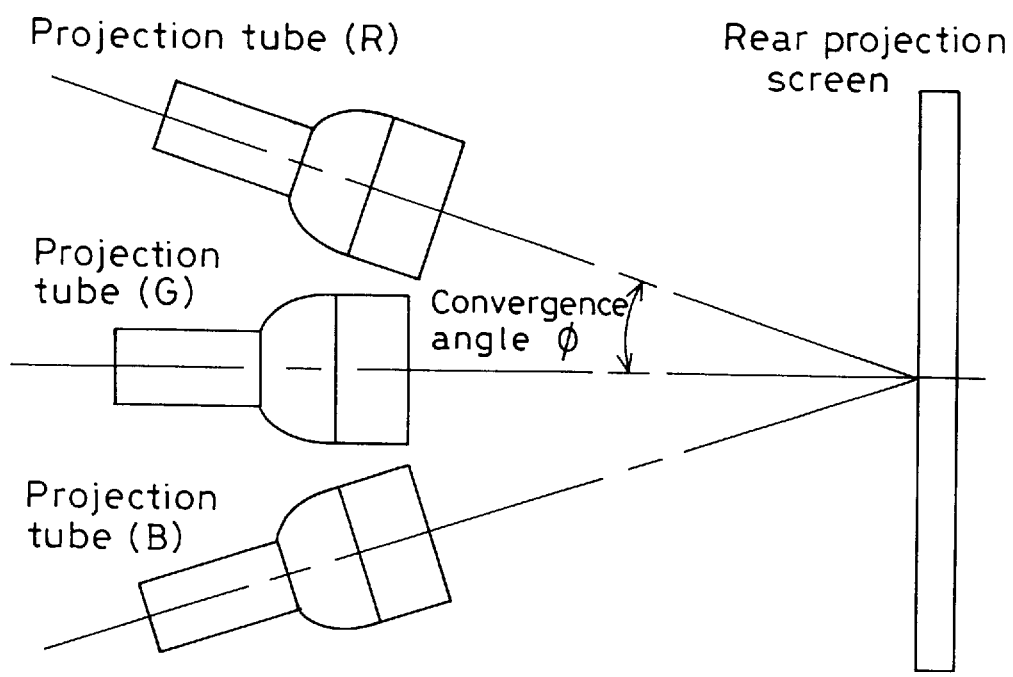
FIG. 2 is a view for describing the convergence angle of projected light.

As shown in FIG. 2, the convergence angle $\phi$ is defined as the angle $\phi$ formed by two adjacent projection tubes with respect to the center of the screen.

In FIG. 1, assuming that the diameter in the x-axis direction (diameter parallel to the screen surface) of the ellipse is a and the diameter in the y-axis direction (diameter perpendicular to the screen surface) is b, the following relations hold: $c=a^2/b$, and $1+k=a^2/b^2$. Accordingly, the above-described conditions for the ellipse, under which the color shift is improved, are as follows:

$$2.5 \leq bp/a^2 \leq 3.0$$

$$0.55 \leq b/(a^2\phi) \leq 0.75 \quad (2)$$

In FIG. 1, assuming that the normal to the bottom of the entrance-side lens surface I is m and the incident angle of light (usually, green light) incident on the bottom at right angles to the lenticular lens sheet surface is $\theta_1$, the thickness L of the lenticular lens sheet from the bottom of the entrance-side lens surface I to the vertex of the exit-side lens surface O should satisfy the following condition in order for the light incident on the bottom of the entrance-side lens surface I at right angles to the lenticular lens sheet surface to intersect the y-axis outside the exit-side lens surface O:

$$L \leq (p/2)/\tan(\theta_1-\theta_2)$$

$$=p/[2\tan\{\theta_1-\arcsin(\sin\theta_1/n)\}] \quad (3)$$

In the above expression, n is the refractive index of the lenticular lens sheet, and $\theta_2$ is the angle of refraction of light incident on the bottom of the entrance-side lens surface I at the incident angle $\theta_1$.

Figure 3:
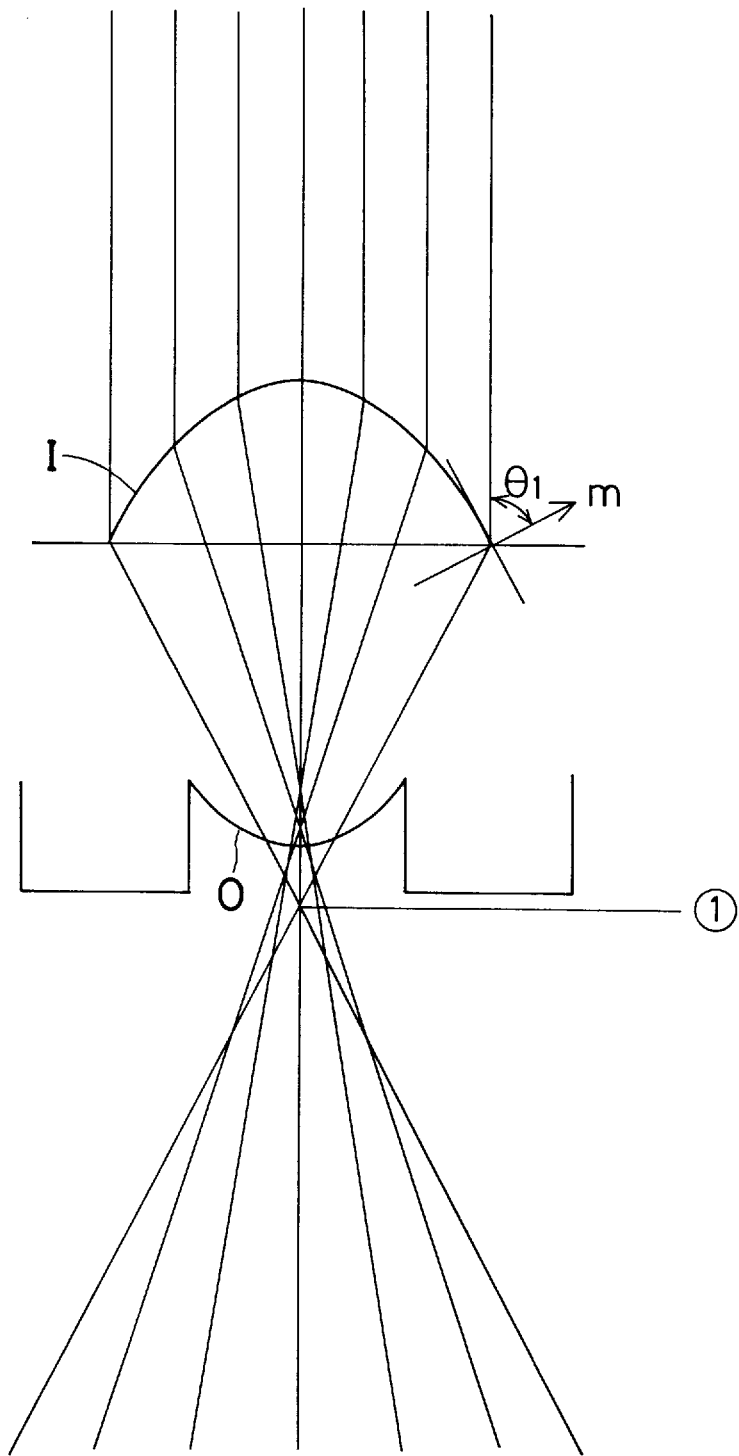
FIG. 3 shows an optical path of light refracted by an entrance-side lens surface when light is made incident on the lenticular lens sheet at right angles to the lenticular lens sheet surface.
Figure 5:
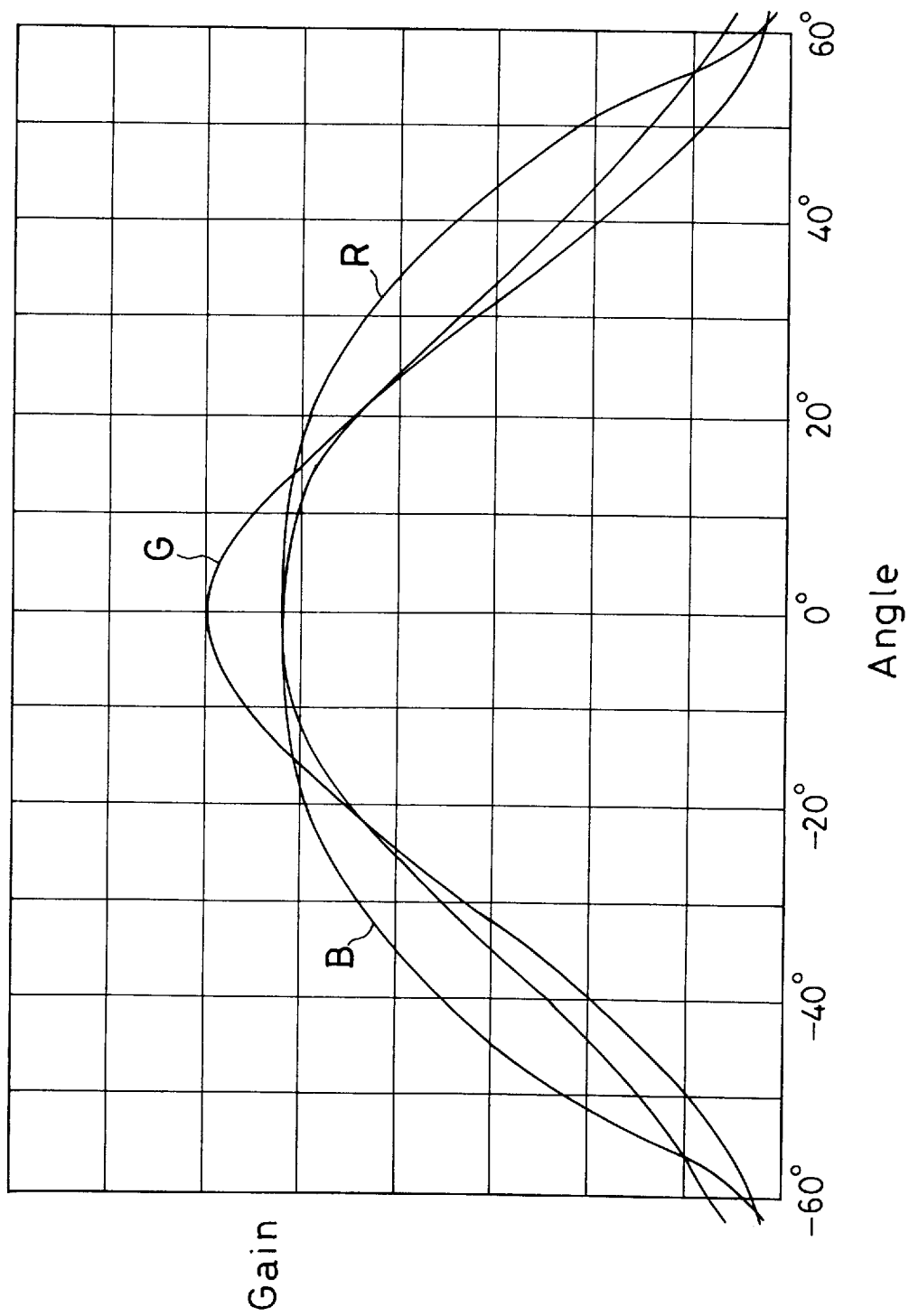
FIG. 5 is a gain chart of Example 1 of the present invention.
Figure 6:
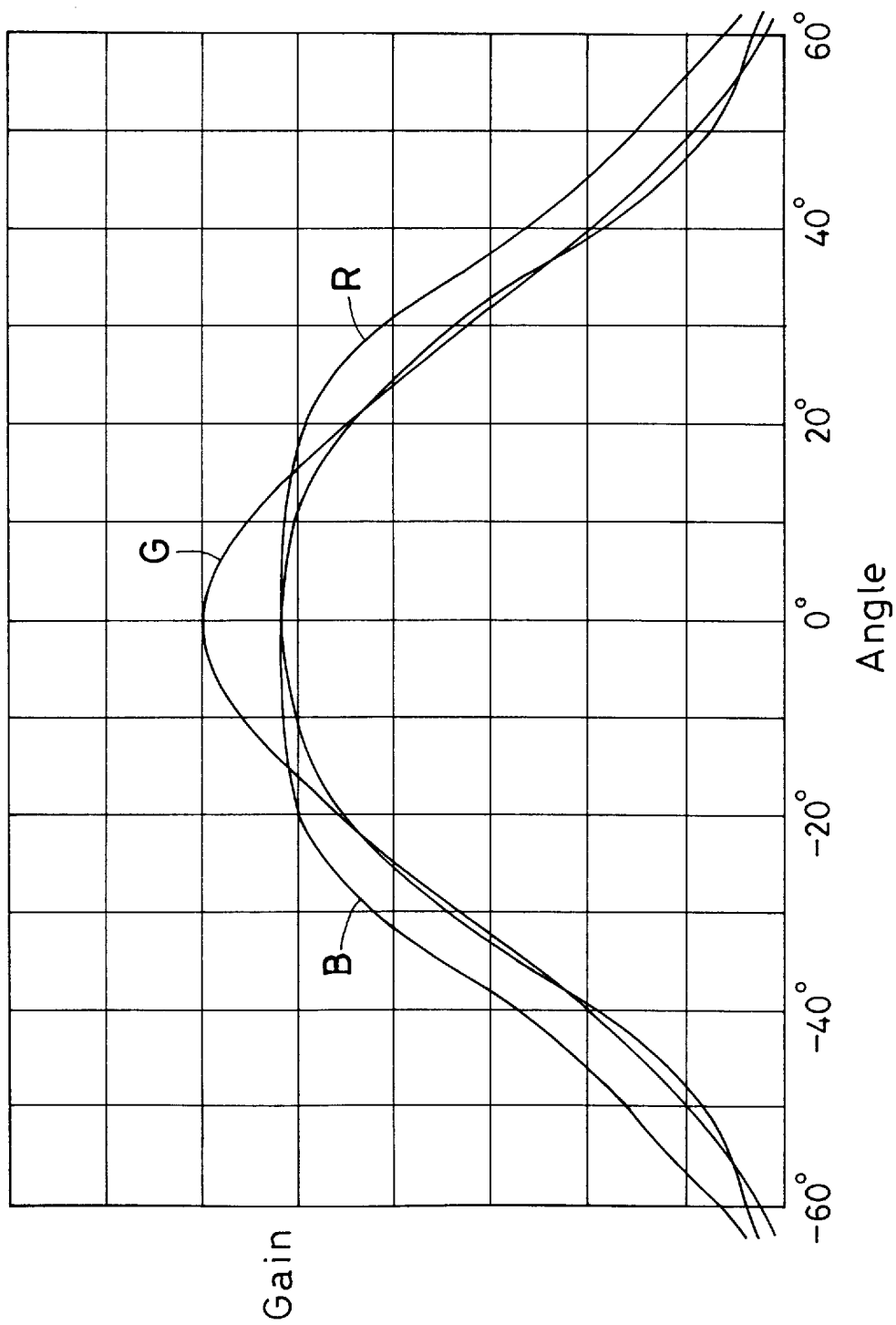
FIG. 6 is a gain chart of Example 2 of the present invention.
Figure 7:
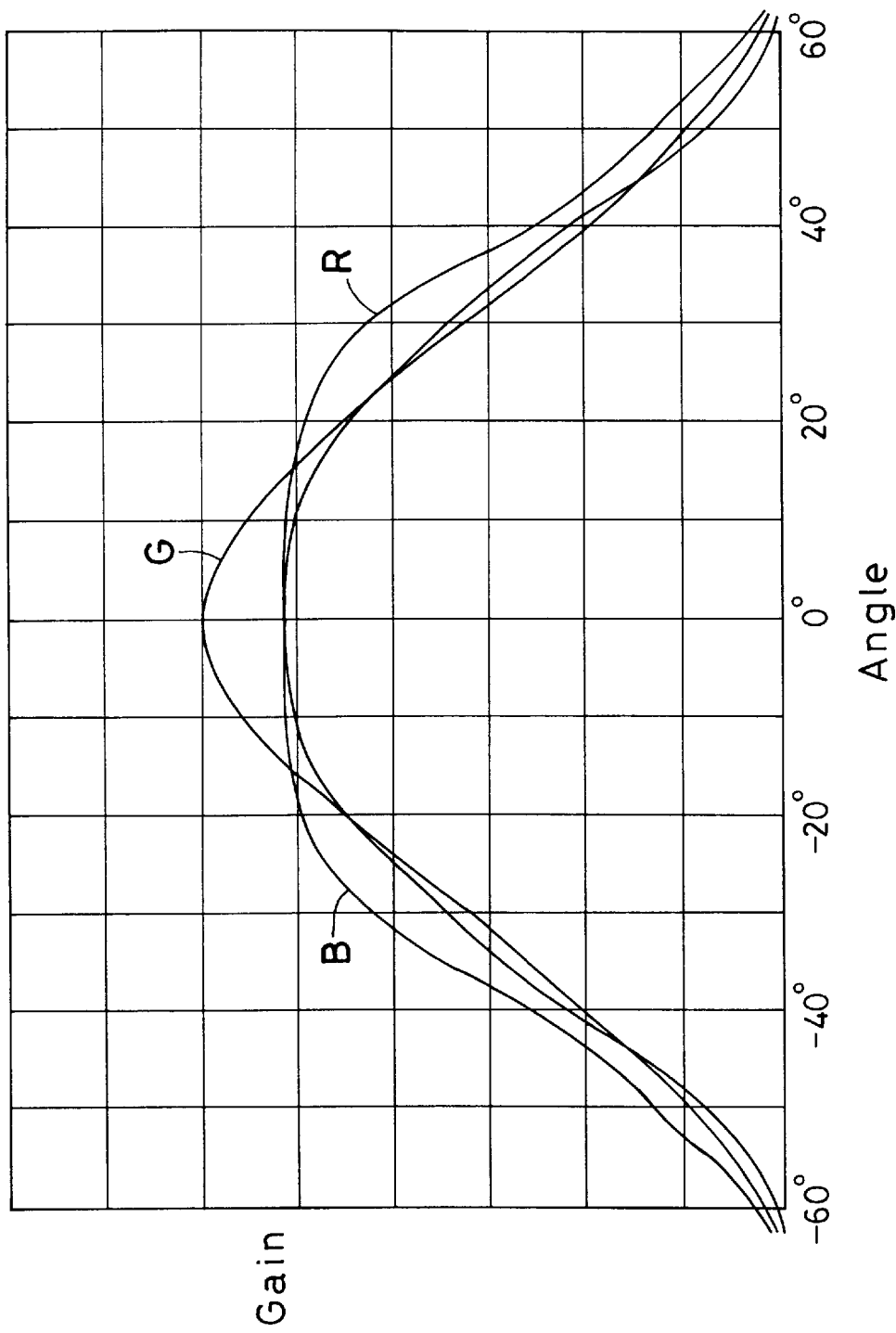
FIG. 7 is a gain chart of Example 3 of the present invention.
Figure 8:
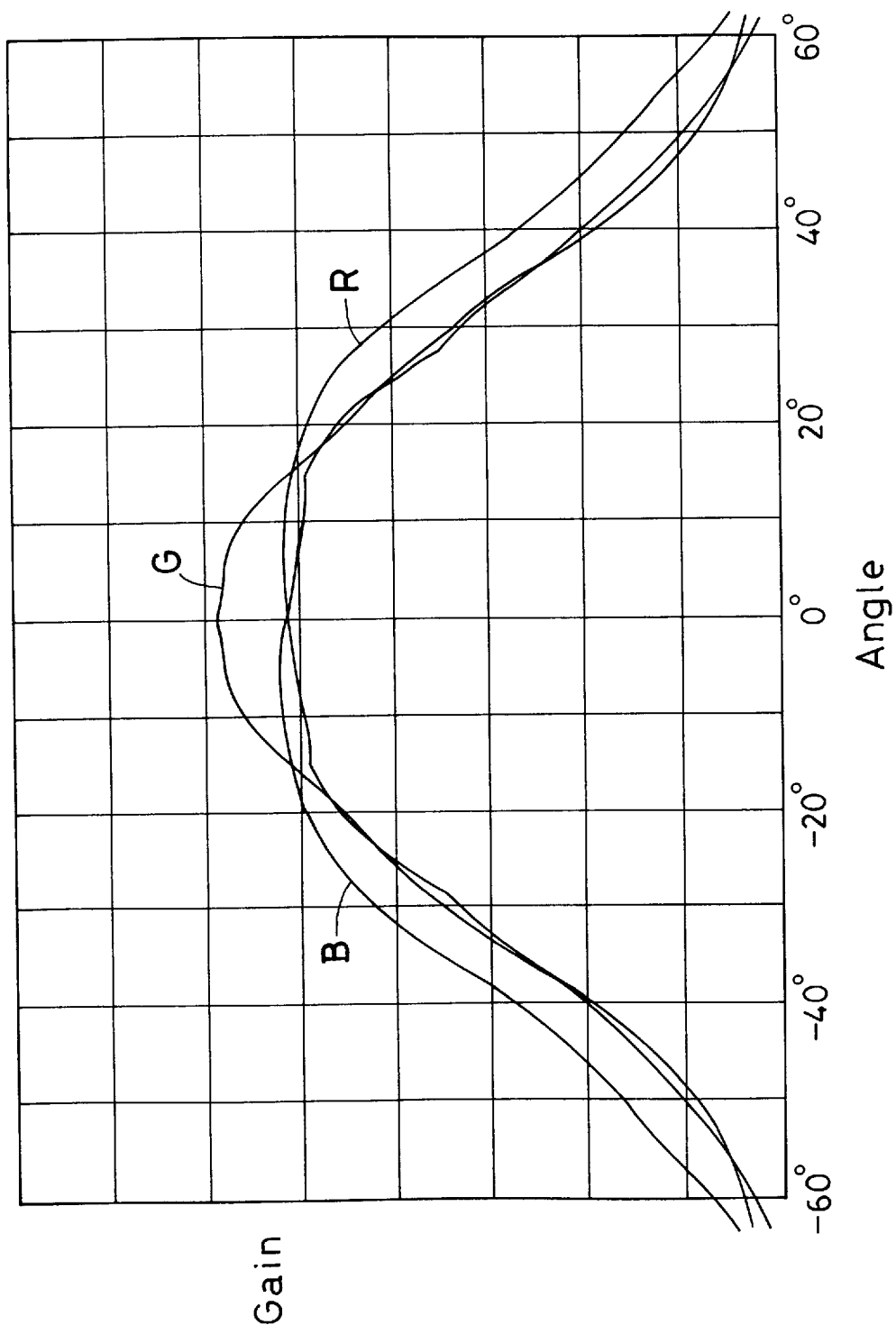
FIG. 8 is a gain chart of Example 4 of the present invention.

FIG. 3 is a diagram showing an optical path when light is made incident on the lenticular lens sheet at right angles to the surface thereof, in which it is assumed that light is not refracted by the exit-side lens surface O.

The feature of this lenticular lens configuration is as follows: Light entering the lenticular lens through the entrance-side lens surface I does not focus at one point but intersects the center line (y-axis) at a point which becomes more distant as the incident position shifts from the vertex through the foot to the bottom of the entrance-side lens surface I. Further, the exit-side lens surface O is set inside the intersection ① (see FIG. 3) between the center line and light entering the entrance-side lens surface I through the foot thereof. Thus, light entering the entrance-side lens surface I through the foot thereof emanates from the lenticular lens sheet at an increased angle by being refracted by the exit-side lens surface O.

The conventional lenticular lens is designed such that incident light focuses in the vicinity of the exit-side lens surface, and light incident on the foot of the entrance-side lens surface is also refracted by the exit-side lens surface so as to emanate in a direction as close to the forward direction as possible, whereas the lenticular lens according to the present invention adopts an idea opposite to the above. By virtue of the feature of the present invention, in the gain chart the characteristic curve has an approximately triangular shape that is approximately uniform in gradient from the center to each end. Consequently, there is no sharp cutoff of gain, and changes of color and brightness become smooth. Moreover, there is no inversion of color due to a cutoff as occurs frequently in the conventional lenticular lens configuration. Therefore, color correction by the exit-side lens surface O is facilitated.

The exit-side lens surface O operates to control the angle of diffusion with respect to green light (G) and also operates to correct the angle with respect to red light (R) and blue light (B). Although many of the conventional television sets have a convergence angle of from 7° to 8°, recent television sets generally have a convergence angle of 10° or more. In conformity to the increased convergence angle, it is preferable to increase the gradient of the mid-slope portion of the exit-side lens surface O, which is a region from which red light and blue light emanate.

In a case where the entrance-side lens surface I is elliptical in its entirety, the angle $\theta_1$ can be obtained as follows:

Differentiating Eq.(1) yields the following equation:

$$dy/dx = -(x/c)/\{1-(1+k)(x/c)^2\})^{1/2} \quad (4)$$

Accordingly, the tilt of the normal to the lens surface at the bottom thereof is given by substituting p/2 for x in Eq.(4), i.e.

$$dy/dx = -(p/2c)/\{1-(1+k)(p/2c)^2\}^{1/2} \quad (5)$$

Since Eq.(5) is equal to tanθ1, the following equation is obtained:

$$\theta_1 = \arctan(dy/dx) = -\arctan[(p/2c)/\{1-(1+k)(p/2c)^2\}^{1/2}] \quad (6)$$

The height |y| of the entrance-side lens surface I is given by $$|y| = [1-\{1-(1+k)(p/2c)^2\}^{1/2}] \div \{(1+k)/c\} \quad (7)$$

FIG. 4 is a view for describing a modification of the present invention, in which two lens surface configurations are shown in combination with each other. In one configuration, the cross-section of the entrance-side lens surface I is not formed from a single ellipse but has at its foot portion a straight line or a part of an inverse circle having a center of curvature in the entrance-side space. In the other configuration, the cross-section of the vertex portion of the entrance-side lens surface I is formed from a part of a circle having a larger radius of curvature than that of the ellipse that defines the sectional configuration of the rest of the entrance-side lens surface I. Adopting either or both of the two configurations enables the characteristic curve in the gain chart to become still gentler and also makes it possible to reduce the difference in luminance between G on the one hand and R and B on the other.

Specific Examples 1 to 4 and a comparative example will be described below.

In any of the examples, the pitch p is 0.75 millimeter; regarding the entrance-side lens surface I, a is 0.5 millimeter, and b is 1.0 millimeter; regarding the exit-side lens surface O, a is 0.4 millimeter, b is 1.1 millimeters, and L is 0.53 millimeter; the refractive index n is 1.5; and the convergence angle φ is 11°. In Example 1, both the entrance-side lens surface I and the exit-side lens surface O have an elliptical sectional configuration. In Example 2, the entrance-side lens surface I has a sectional configuration in which 7.5% of each foot of the entrance-side lens surface I is formed from a straight line. In Example 3, the entrance-side lens surface I has a sectional configuration in which 7.5% of each foot of the entrance-side lens surface I is formed from a part of an inverse circle having a radius of 0.5 millimeter. In Example 4, the entrance-side lens surface I has a sectional configuration in which 30% of the vertex portion of the entrance-side lens surface I is formed from a part of a circle, in addition to the sectional configuration according to Example 2. The normal angle $\theta_1$ is 64.3° in Example 1, 57.1° in Example 2, 32.9° in Example 3, and 57.1° in Example 4. At the joint between each pair of adjacent lenticular lenses, the two lenses are cemented together such that the tangential angles of the respective configurations are equal to each other. In each example, $bp/a^2=2.75$ for the entrance-side lens surface I, and $b/(a^2\phi)=0.623$ for the exit-side lens surface O.

Figure 9:
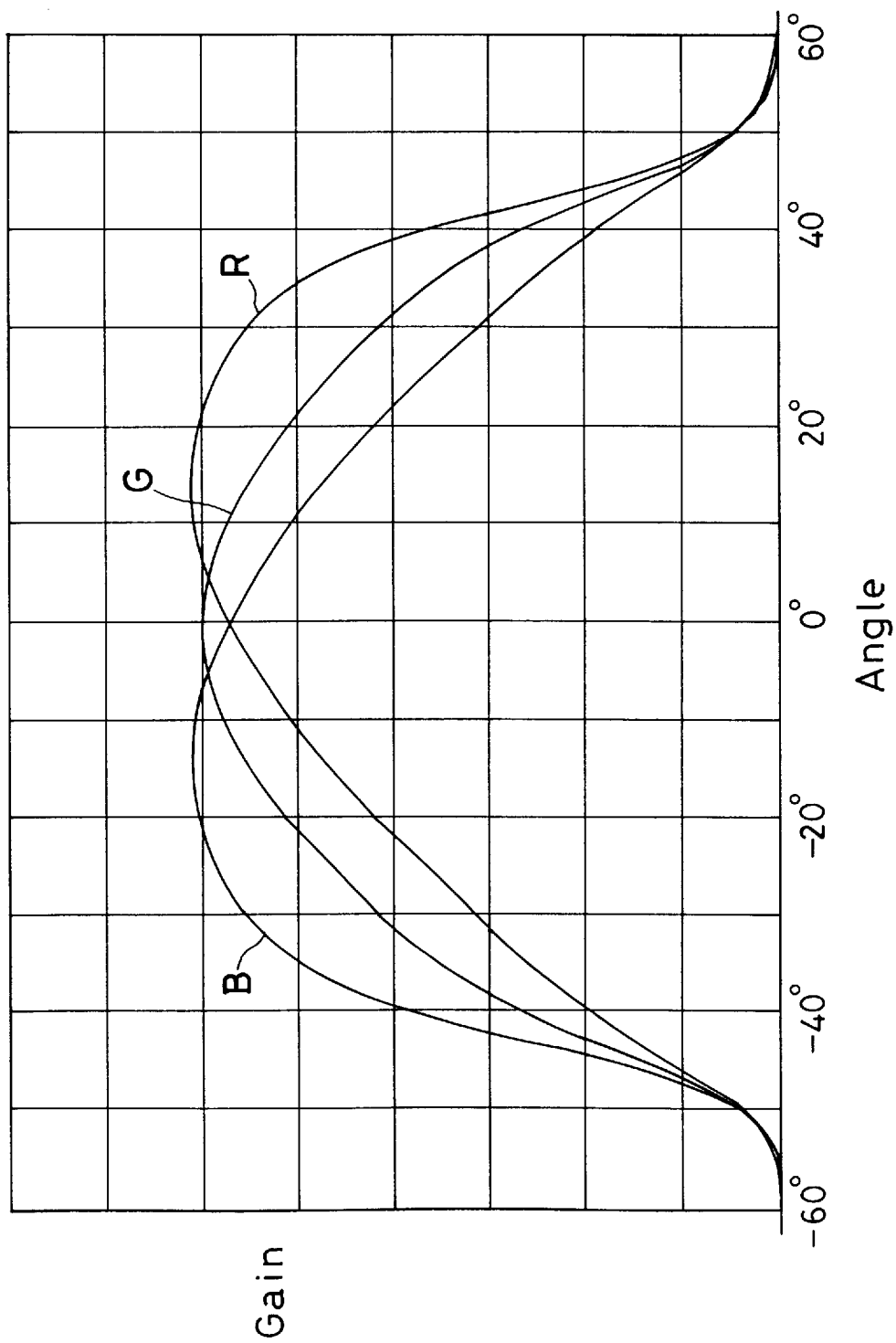
FIG. 9 is a gain chart of a comparative example.
Figure 10:
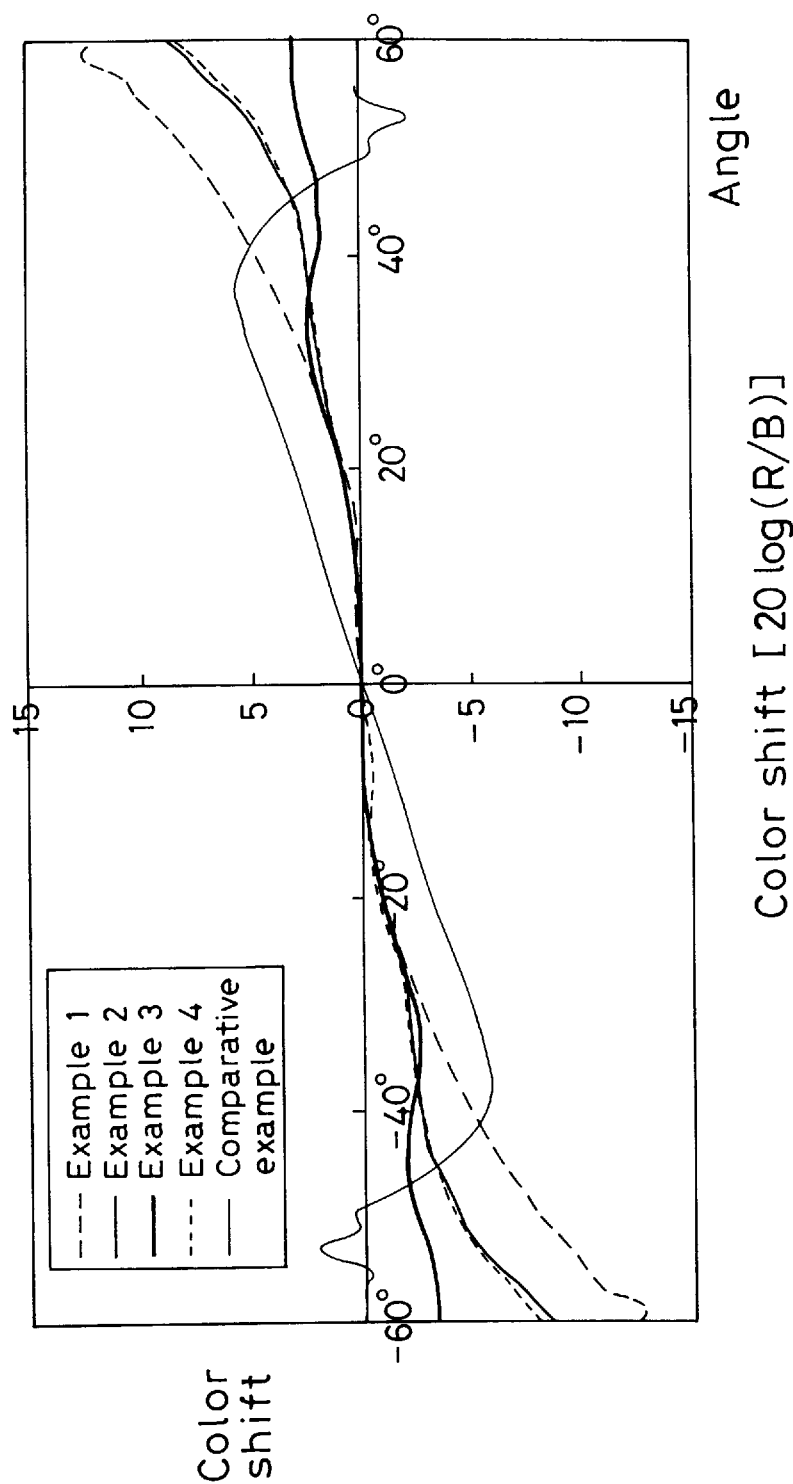
FIG. 10 is a chart showing color shifts in Examples 1 to 4 of the present invention and in the comparative example.

FIGS. 5 to 8 show gain charts of Examples 1 to 4, respectively. FIG. 9 shows a gain chart of a comparative example. In the comparative example, $bp/a^2=2.27$ for the entrance-side lens surface, and $b/(a^2\phi)=0.257$ for the exit-side lens surface. FIG. 10 is a chart showing color shifts in Examples 1 to 4 and comparative example.

It will be understood from FIGS. 5 to 10 that the lenticular lens sheets according to the present invention are improved in color shift at angles within 40° at which many people observe television screens. Accordingly, the use of the lenticular lens sheets according to Examples 1 to 4 makes it possible to improve the uniformity of color over the whole screen when the screen is viewed from an oblique direction in comparison to the comparative example.

Figure 11:
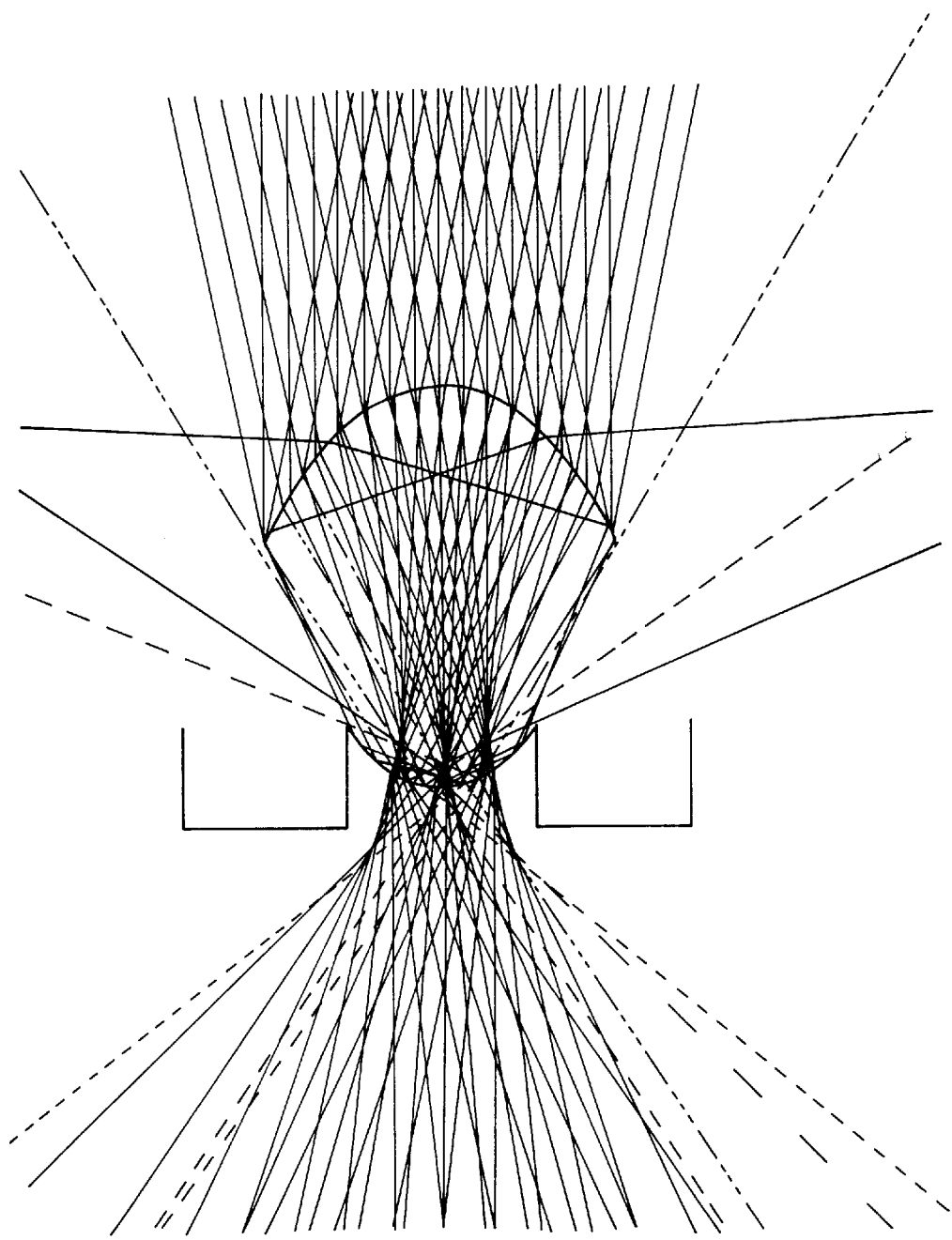
FIG. 11 illustrates an RGB ray trace in Example 1 of the present invention.
Figure 12:
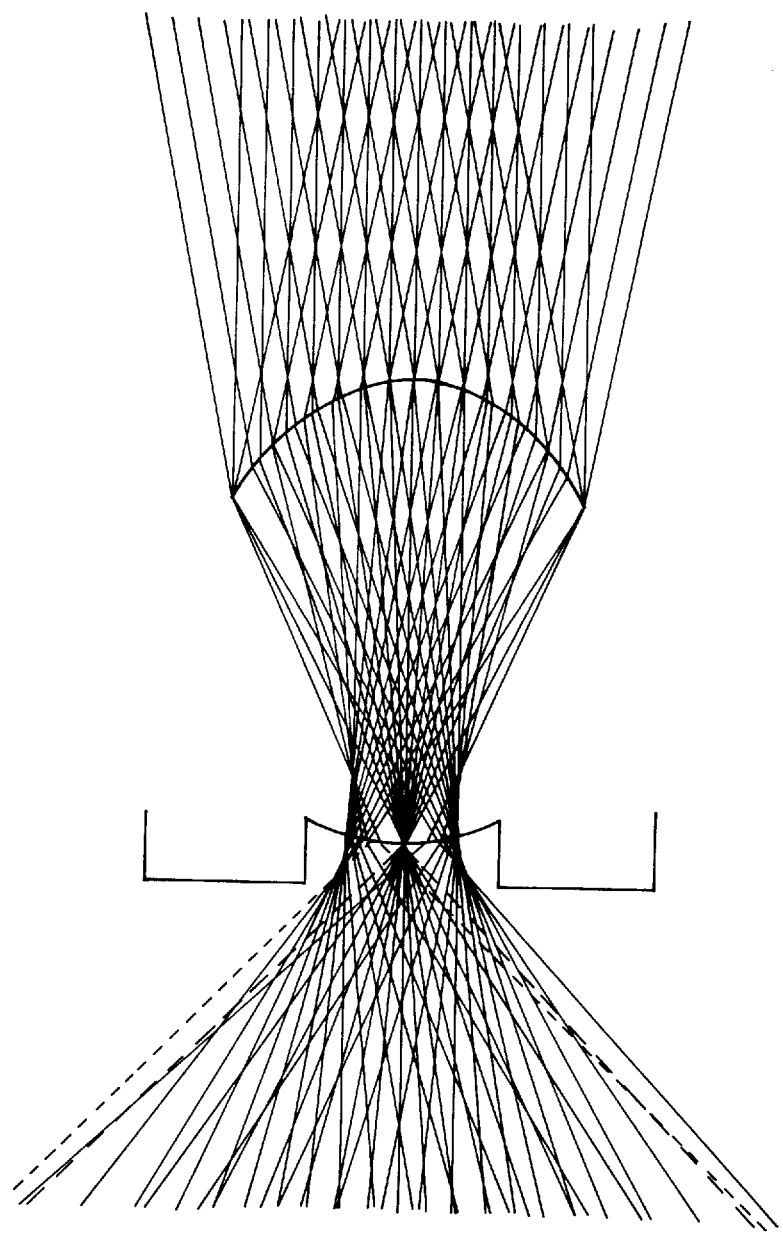
FIG. 12 illustrates an RGB ray trace in the comparative example.

For reference, RGB ray traces of the above-described Example 1 and comparative example are illustrated in FIGS. 11 and 12.

Figure 13:
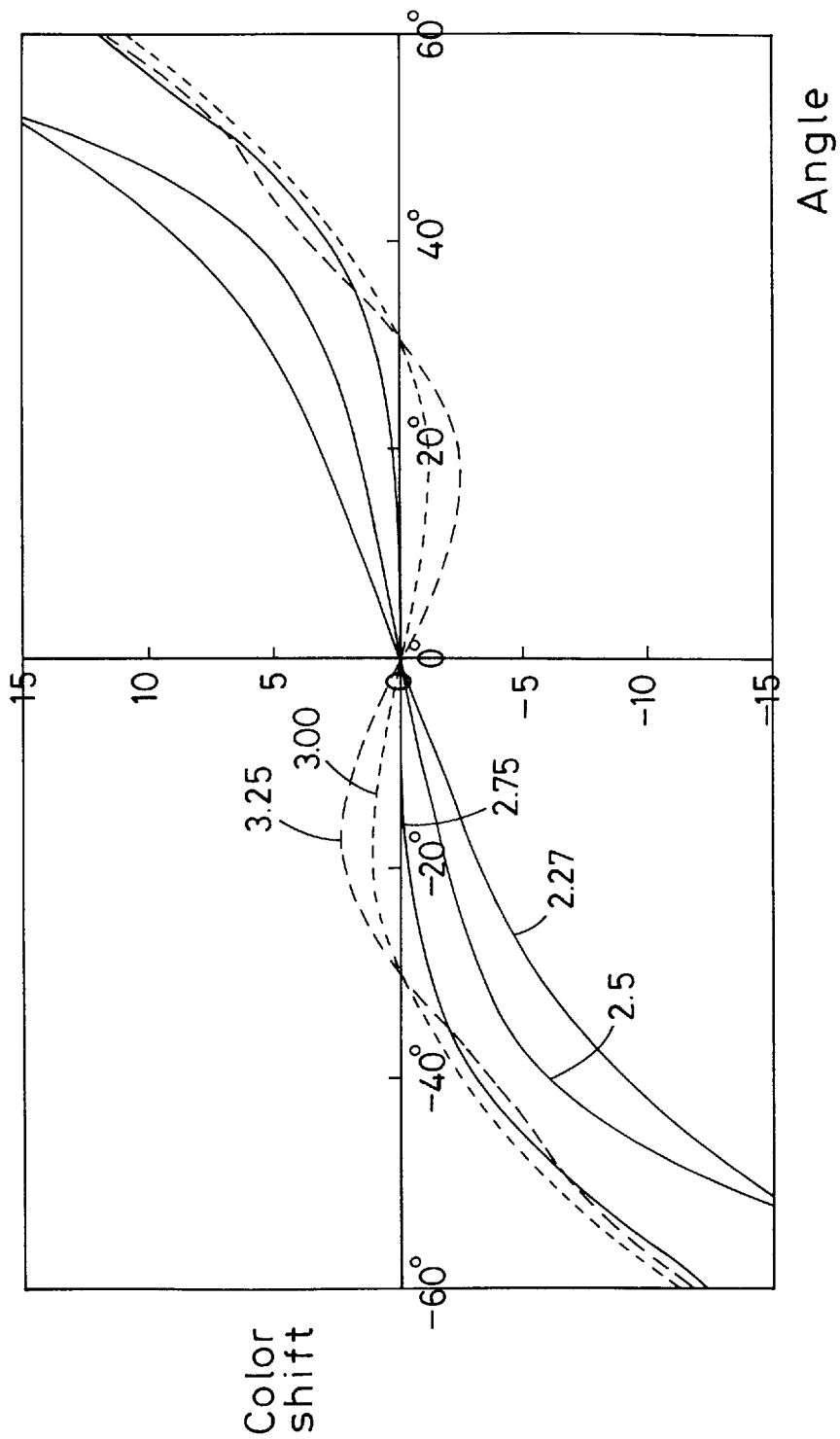
FIG. 13 is a color shift chart in a case where parameters of an entrance-side lens surface are changed.

FIG. 13 is a color shift chart similar to FIG. 10 in a case where $bp/a^2$ is changed in the range of from 2.27 to 3.25 for the entrance-side lens surface. Parameters other than those of the entrance-side lens surface are the same as in Example 1. When $bp/a^2$ is 2.27, the color shift shows a relatively large value even at a small angle, whereas, when $bp/a^2$ is in the range of from 2.5 to 3.0, the color shift becomes large from an angle near 40°. The increase of the color shift at angles of 40° and more can be minimized by forming the foot of the sectional configuration of the entrance-side lens surface I from a straight line or a part of an inverse circle as in Examples 2 and 3. When $bp/a^2$ is 3.25, the color shift becomes large in the opposite direction in the vicinity of 20°.

Figure 14:
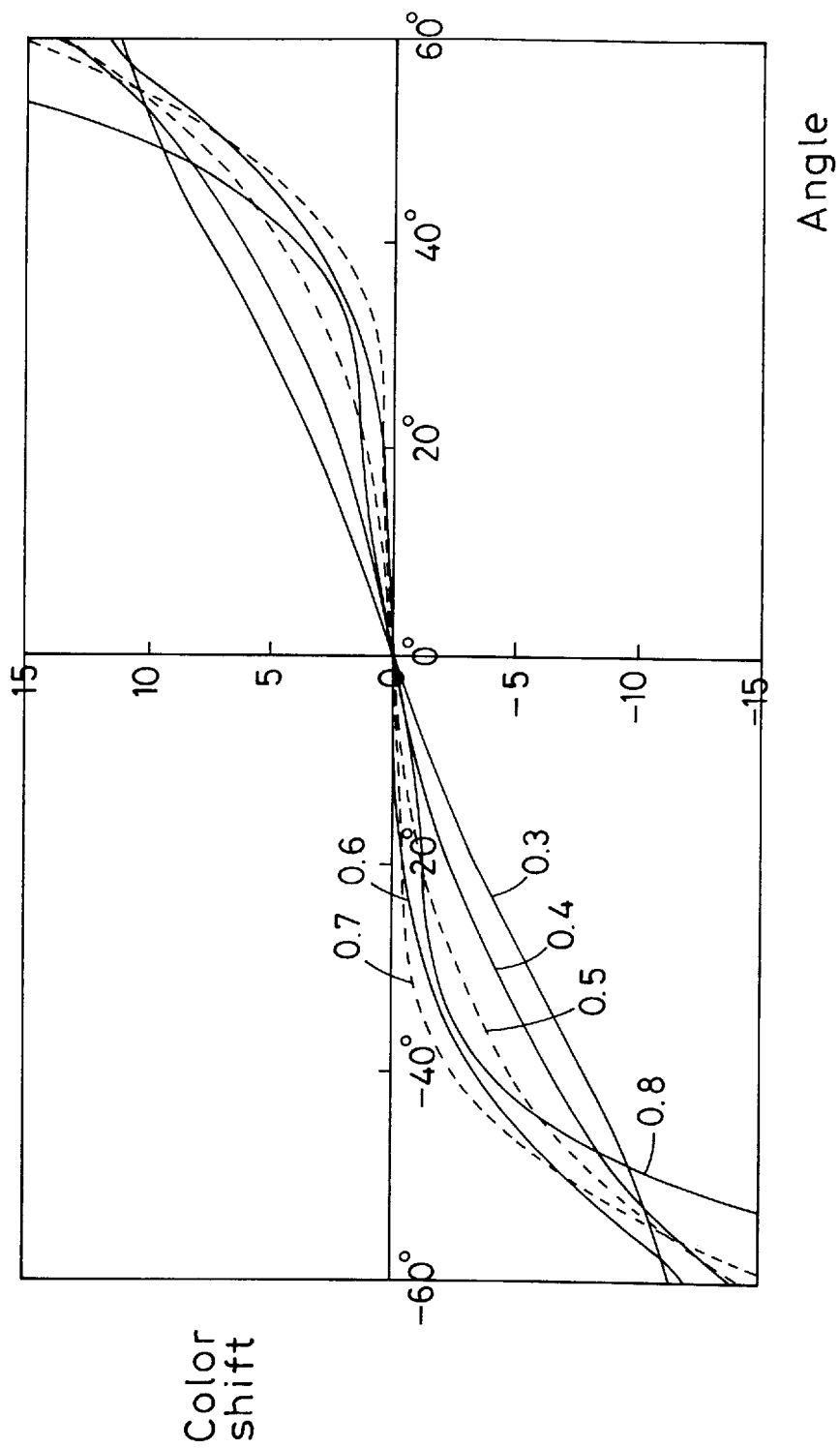
FIG. 14 is a color shift chart in a case where parameters of an exit-side lens surface are changed.
Figure 15:
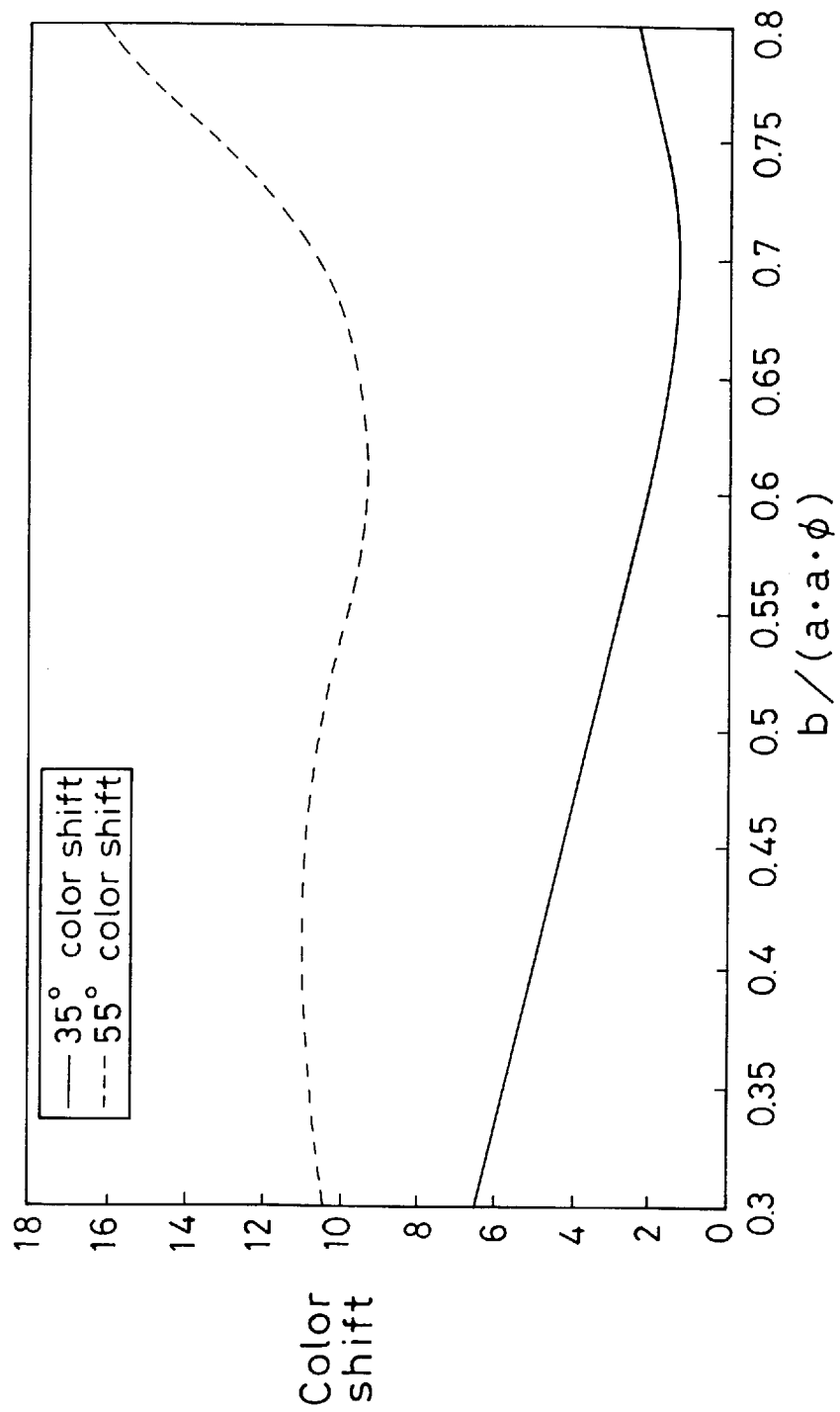
FIG. 15 is a chart in which color shifts at specific angles are plotted with respect to a parameter of the exit-side lens surface.
Figure 16:
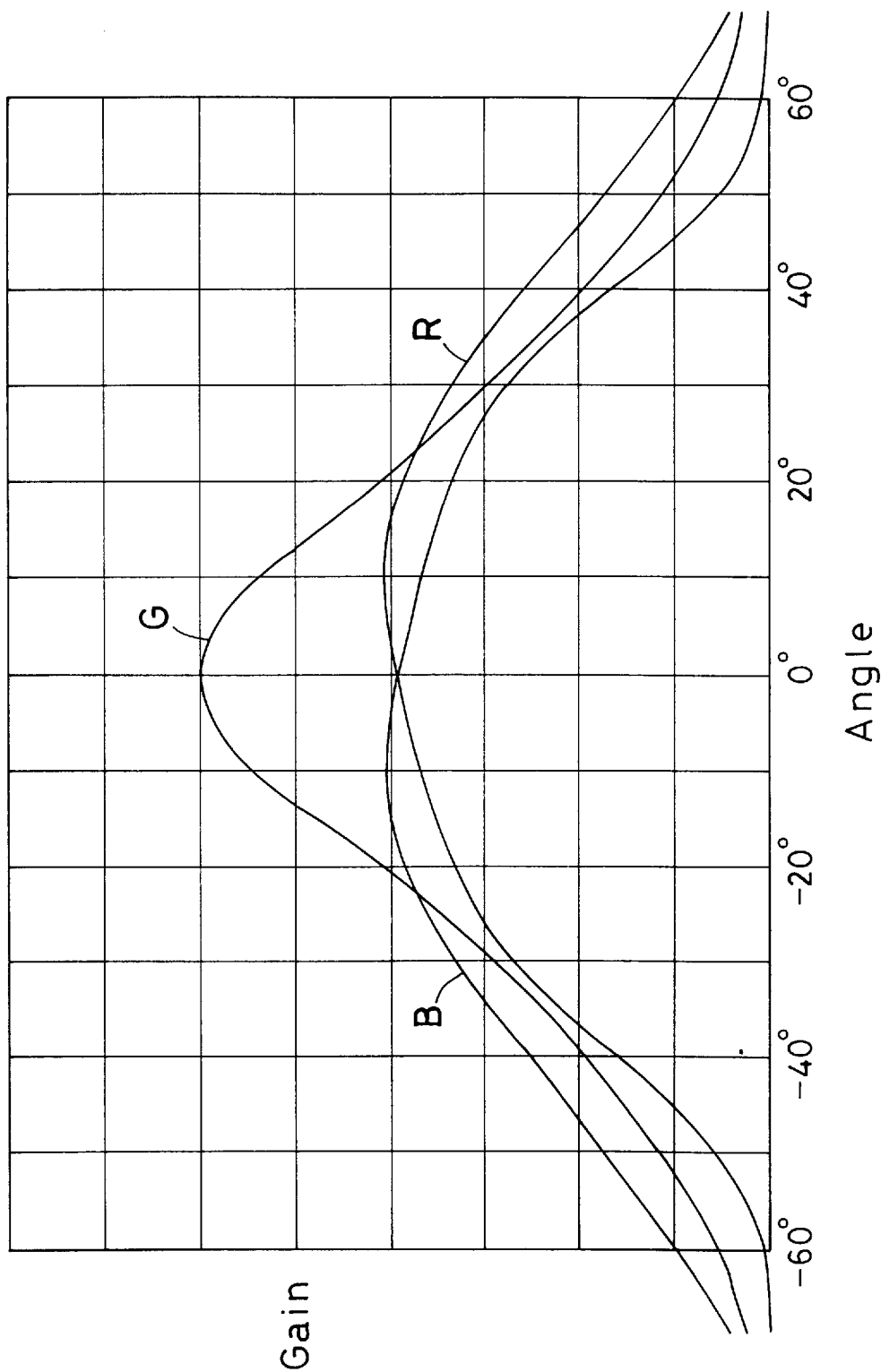
FIG. 16 is a gain chart at $b/(a^2\phi)=0.8$.

FIG. 14 is a color shift chart similar to FIG. 10 in a case where $b/(a^2\phi)$ is changed in the range of from 0.3 to 0.8 for the exit-side lens surface. Parameters other than those of the exit-side lens surface are the same as in Example 1. FIG. 15 is a chart in which color shifts at 35° and 55° are plotted with respect to the values of $b/(a^2\phi)$. It will be understood from FIG. 15 that the color shift at 35° reaches a minimum at 0.7 for $b/(a^2\phi)$ and is 2 or less in the range of from 0.65 to 0.75 for $b/(a^2\phi)$. The color shift at 55° reaches a minimum at 0.6 for $b/(a^2\phi)$ and is 10 or less in the range of from 0.55 to 0.65 for $b/(a^2\phi)$. It will be understood from FIGS. 14 and 15 that $b/(a^2\phi)$ is preferably set in the range of from 0.55 to 0.75, and that an optimum value is 0.65. It should be noted that in these color shift charts only R and B light are considered, and G light is not taken into account. FIG. 16 shows a gain chart at $b/(a^2\phi)=0.8$. As will be understood from the figure, if $b/(a^2\phi)$ is set at an excessively large value, the difference between G on the one hand and R and B on the other becomes unfavorably large.

As will be clear from the foregoing description, the use of the lenticular lens sheet according to the present invention makes it possible to obtain a rear projection screen exhibiting smooth color change and having a wide viewing angle even in a television set having a large convergence angle.

What I claim is:

1. A lenticular lens sheet used for a rear projection screen of a rear projection television, said lenticular lens sheet comprising:

a group of vertical straight-line shaped entrance-side lens surfaces provided on an entrance side of said lenticular lens sheet, said entrance-side lens surfaces each having a cross-section defined by a part of an ellipse, and said entrance-side lens surfaces satisfying the following condition:

$2.5 \leq bp/a^2 \leq 3.0$ where b is a major axis of said ellipse; a is a minor axis of said ellipse; and p is a width of each of said entrance-side lens surfaces;

a group of vertical straight-line shaped exit-side lens surfaces provided on an exit side of said lenticular lens sheet, said exit-side lens surfaces each having a light-blocking portion and a cross-section defined by a part of an ellipse, said exit-side lens surfaces satisfying the following condition:

$0.55 \leq b/(a^2\phi) \leq 0.75$ where b is a major axis of said ellipse; a is a minor axis of said ellipse; and $\phi$ is an angle formed by two adjacent projection tubes with respect to a center of a screen sheet; and a light-absorbing layer provided on each of said light-blocking portions of said exit-side lens surfaces;

wherein a thickness L of said lenticular lens sheet from a bottom of each entrance-side lens surface to a vertex of each exit-side lens surface satisfies the following condition:

$L \leq p/[2 \tan \{\theta_1 - \arcsin(\sin \theta_1)/n\}]$ where p: a lenticular lens pitch of said lenticular lens sheet;

$\theta_1$: an angle of a normal to the entrance-side lens surface at the bottom of the entrance-side lens surface; and n: a refractive index of said lenticular lens sheet.

2. A lenticular lens sheet according to claim 1, wherein said cross-section of each said entrance-side lens surfaces is defined by a part of said ellipse except for a foot portion of the entrance-side lens surface in a range of from 2% to 10% from said bottom which is formed from one of a straight line and a part of an inverse circle having a center of curvature in an entrance-side space.

3. A lenticular lens sheet according to claim 1, wherein said cross-section of each said entrance-side lens surfaces is defined by a part of said ellipse except for a vertex portion of the entrance-side lens surface which is formed from part of a circle having a larger radius of curvature than that of said ellipse.

4. A lenticular lens sheet according to claim 1, wherein said cross-section of each said entrance-side lens surfaces is defined by a part of said ellipse except for a foot portion of the entrance-side lens surface in a range of from 2% to 10% from said bottom which is formed from one of a straight line and a part of an inverse circle having a center of curvature in an entrance-side space and a vertex portion of the entrance-side lens surface which is formed from part of a circle having a larger radius of curvature than that of said ellipse.

* * * * *